Patented May 27, 1924.

1,495,270

UNITED STATES PATENT OFFICE.

JOB MORTEN AUGUST STILLESEN, OF CHICAGO, ILLINOIS.

FERTILIZER.

No Drawing. Application filed April 12, 1917, Serial No. 161,393. Renewed October 18, 1923.

*To all whom it may concern:*

Be it known that I, JOB MORTEN AUGUST STILLESEN, a subject of the King of Norway, residing at Chicago, in the county of Cook and State of Illinois, have invented certain new and useful Improvements in Fertilizers, of which the following is a specification.

This invention relates to fertilizers, and has particular reference to the production of phosphate fertilizer materials both with and without combined nitrogen.

The phosphoric acid contained in natural phosphate rock or in other phosphate compounds, bone phosphate, etc., is generally in the insoluble form of tricalcium phosphate ($Ca_3(PO_4)_2$), and is commonly converted by treatment with sulphuric acid into "super" or "acid" monocalcium phosphates, according to the reaction:

(1) $Ca_3(PO_4)_2 + 2H_2SO_4 = CaH_4(PO_4)_2 + 2CaSO_4$, or to dicalcium phosphate.

(2) $Ca_3(PO_4)_2 + H_2SO_4 = 2CaHPO_4 + CaSO_4$.

If lime (CaO), or a lime containing material such as results upon treating calcium carbide with nitrogen in a furnace ($CaCN_2 + CaO$), be added to monocalcium phosphate, the latter is reverted into dicalcium phosphate ($CaHPO_4$), which is less soluble than monocalcium phosphate, or even into the original insoluble form of tricalcium phosphate, or a mixture of both, according to the following reactions:

(3) $CaH_4(PO_4)_2 + CaO = 2CaHPO_4 + H_2O$.

(4) $2CaHPO_4 + CaO = Ca_3(PO_4)_2 + H_2O$.

Hydrated lime ($CaO_2H_2$) acts similarly. Lime nitrogen directly from the nitrogen furnace contains upwards of 20% of lime, or if hydrated, upwards of 25% of $CaO_2H_2$.

Dicalcium phosphate is partially available as plant food, although not easily soluble in water, but soluble in a solution of citric acid, and is therefore termed in the trade "citrate soluble phosphate." It is available by plants because carbon dioxide contained in water in the soil re-acts to produce monocalcium phosphate, as follows:

(5) $2CaHPO_4 + CO_2 + H_2O = CaH_4(PO_4)_2 + CaCO_3$.

Dicalcium phosphate, if heated, partially reverts to tricalcium phosphate, and becomes to that extent non-available, as follows:—

(6) $4CaHPO_4 + heat = Ca_3(PO_4)_2 + CaH_4(PO_4)_2$.

In view of the foregoing, it has been impracticable to combine phosphate and lime nitrogen fertilizer materials together, owing to the reversion of the available phosphates to the unavailable form in the presence of hydrated or unhydrated lime.

The objects of this invention are to provide an improved process whereby combined fertilizer materials composed of available phosphates and lime nitrogen can be cheaply produced, and also containing in the preferred embodiment, useful calcium carbonate instead of comparatively useless calcium sulphate. The invention comprises the novel process, as well as the novel products, which latter are useful either directly as fertilizers, or for compounding with other materials.

I have discovered that unavailable phosphates can be rendered available by treatment with carbon dioxide and water, as follows:

(7) $Ca_3(PO_4)_2 + 2CO_2 + 2H_2O = CaH_4(PO_4)_2 + CaCO_3$ or citric acid soluble phosphate acts according to the following:—

(8) $2CaHPO_4 + CO_2 + H_2O = CaH_4(PO_4)_2 + CaCO_3$

The carbon dioxide can be either gaseous, solid, or liquid, or can be in a condition of expansion from solid or liquid to gas. The dicalcium phosphate can be obtained either by mixing the tricalcium phosphate with monocalcium phosphate, as follows:—

(9) $Ca_3(PO_4)_2 + CaH_4(PO_4)_2 = 4CaHPO_4$ or by reactions (2) or (3) above, or as follows:

(10) $Ca_3(PO_4)_2 + CO_2 + H_2O = 2CaHPO_4 + CaCO_3$.

Available phosphates made by the carbon dioxide process above described, are preferable for use alone or with lime nitrogen by reason of their calcium carbonate content, over available phosphates as heretofore made by the sulphuric acid process. Other advantages will later appear.

Having obtained available phosphates, such as dicalcium phosphate, or monocalcium phosphate, as above described, the next step is the combination thereof, with lime nitrogen.

In my Patent 982,311, is disclosed a process of treating calcium carbide with nitrogen and carbon dioxide, whereby the lime present as such is transformed into carbonate, with consequent elimination of the objectionable caustic qualities of ordinary calcium cyanamid. Subsequently, I discovered a modification of such process whereby the transformation of the lime is effected by solid or liquid carbon dioxide, or with carbon dioxide gas under expansion, whereby the lime in lime nitrogen mixture is transformed into either normal, or one or more basic calcium carbonates, according to the quantity of carbon dioxide, and water, as follows:

(11) $CaO + CO_2 = CaCO_3$, or a basic carbonate, as—

(12) $2CaO + CO_2 = CaCO_3.CaO$, or another basic carbonate:

(13) $3CaO + 2CO_2 = 2CaCO_3.CaO$, etc.

If water be present, the lime is changed into one or more normal or basic hydrated carbonates, according to the quantity of carbon dioxide, as follows:

(14) $2CaO + CO_2 + H_2O = CaCO_3.Ca(OH)_2$.

(15) $3CaO + 2CO_2 + H_2O = 2CaCO_3.Ca(OH)_2$, etc., or the water added may be wholly or partly evaporated by the heat given off by the combining of the $CO_2$ and lime.

By using such treated or carbonated lime nitrogen for mixing with an available or super phosphate, or a citrate soluble phosphate, there is no appreciable deleterious reaction between the lime carbonates and the phosphoric acid, such as occurs when the lime is present as calcium oxide or hydroxide. Calcium carbonates resist the action of phosphoric acid, because the carbonates must first be broken up and the carbon dioxide driven off before the lime and phosphoric acid can combine. It is therefore apparent that an available phosphate can be readily mixed with lime nitrogen containing normal or basic carbonates, or both, without reversion to unavailable phosphate. When such a carbonate containing compound is in the soil, the carbon dioxide set free by phosphoric acid, or soil acids, will react with any unavailable or water insoluble phosphates according to reaction (5) above, converting it into the more soluble and available compound.

The insoluble unavailable tricalcium phosphate can be mixed with calcium carbide and heated in the lime nitrogen furnace. The nitrogen is absorbed by the calcium carbide according to the well-known reaction, while the carbon set free will have a reducing action on the tricalcium phosphate. The reducing action can be assisted by adding silicon, or a flux, such as silica ($SiO_2$). A product is thereby obtained comprising lime nitrogen, lime, tricalcium phosphate or partly reduced tricalcium phosphate, carbon, and some unchanged calcium carbide. By treating this product with water and carbin dioxide gas, the lime is converted into carbonate, and the calcium phosphate rendered available, either as monocalcium phosphate, or dicalcium phosphate, or both. Instead of tricalcium phosphate, the dicalcium and monocalcium phosphate can be used for mixing with the calcium carbide.

Also, tricalcium phosphate or dicalcium phosphate can be mixed with raw lime nitrogen containing lime, some carbide, etc., and treated with carbon dioxide and water, converting the lime into carbonate, and the unavailable phosphate into either of the available forms of super or citrate soluble phosphate, or partly of either.

If monocalcium phosphate is mixed with raw lime nitrogen and treated with water and carbon dioxide, the reaction is

(16) $CaCN_2 + CaO + CaH_4(PO_4)_2 + CO_2 + H_2O = CaCN_2 + CaCO_3 + CaH_4(PO_4)_2 + H_2O$.

The water added in this reaction either evaporates or combines with the carbonates of lime.

If dicalcium phosphate is used, the reaction is:

(17) $CaCN_2 + CaO + 2CaHPO_4 + 2CO_2 + H_2O = CaCN_2 + CaH_4(PO_4)_2 + 2CaCO_3$.

If tricalcium phosphate is treated with raw lime nitrogen, the reaction is:

(18) $Ca_3(PO_4)_2 + CaCN_2 + CaO + 2H_2O + 3CO_2 = CaH_4(PO_4)_2 + CaCN_2 + 3CaCO_3$.

If treated lime nitrogen, such as above described where the lime has been converted into carbonate be used with tricalcium phosphate, the reaction is:

(19) $Ca_3(PO_4)_2 + CaCN_2 + CaCO_3 + 2H_2O + 2CO_2 = CaH_4(PO_4)_2 + CaCN_2 + 3CaCO_3$.

If dicalcium phosphate be used with carbonated lime nitrogen, the reaction is:

(20) $2CaHPO_4 + CaCN_2 + CaCO_3 + CO_2 + H_2O = CaH_4(PO_4)_2 + CaCN_2 + 2CaCO_3$.

If tricalcium phosphate is mixed with commercial calcium carbide, the reaction is:

(21) $Ca_3(PO_4)_2 + CaC_2 + CaO + 2N = Ca_3(PO_4)_2 + CaCN_2 + C + CaO$ which is then treated with water and carbon dioxide gas according to reaction (18).

A particular advantage of this invention is present where lime nitrogen just as received from the nitrogen furnace is to be combined with available phosphates. Commercial calcium carbide usually contains free lime (CaO), which lime is "overburned" and does not change in the nitrogen furnace. The theory of the formation of calcium carbide is that lime is melted by the high heat of the carbide furnace and dissolves carbon, but there always remains in the commercial carbide some lime, which cools and crystallizes. Such lime is called "overburned," and is hard and very difficult to slake. It also combines with difficulty with carbon dioxide. Moreover, lime nitrogen comes from the nitrogen furnace in lumps, so that the lime present unless pulverized, will not as readily combine with carbon dioxide. There will also be some free carbide in raw lime nitrogen.

My preferred procedure is to pulverize the raw lime nitrogen mixture and then sprinkle and mix with water. The amount can vary from twice to three times the amount necessary to slake the lime present and remove the carbide, to as low as 5% to 10% of this amount. By reason of the lime being overburned in whole or in part, it does not easily slake as the water enters very little into combination with this overburned lime. By now exposing moistened raw lime nitrogen to carbon dioxide in solid form, or passing from solid to gas, or under expansion, the carbon dioxide immediately and readily combines with lime, the reaction between the lime and the carbon dioxide gas giving off heat, and evaporating the water. If after the treatment, uncombined water remains, it is driven off by heating below 100° C., so as to prevent the formation of dicyandiamid ($C_2N_4H_4$) and calcium hydroxide. My product is in small grains ready for market without either crushing or briqueting. The expanding gas absorbs heat, so that the temperature can be so controlled as to prevent decomposition of cyanamid. More gas is taken up if more water be added, thus enabling one or more carbonates to be obtained. If lumps of lime nitrogen are wet with water, the water is absorbed, and if then treated with carbon dioxide under expansion, the gas will penetrate the lumps, combine with the lime, drive off the water, and the lumps will fall to pieces, giving as a final marketable product, carbonated lime nitrogen in granulated form. This avoids pulverizing or briqueting the final material, and also avoids the objectionable dusty qualities of ordinary lime nitrogen. This material, being without calcium oxide, does not revert available phosphates, and I consider that the failure to heretofore prevent reversion of available phosphates has been due to the presence of free or slaked lime in the lime nitrogen.

One possible explanation is that other than normal hydroxides of lime are formed, such as $2CaO.H_2O$. More probably, the water has a catalytic action and accelerates the reaction. Again, the water may dissociate the lime to such an extent as to accelerate the reaction with $CO_2$, or the water and the expanding $CO_2$ may combine into $H_2CO_3$ which then reacts with lime. There is no doubt but that $CO_2$ in transitu from solid to gas has an important function, owing to the nascent condition of the molecules of the gas which exists when the expanding gas reacts with the water treated lime, under the stated conditions of temperature, vis viva of the gas, its kinetic energy, etc. The exact explanation of the results I have discovered yet remains to be given, because chemical investigations in low temperatures, with compressed gases, or gases going directly from solid to gaseous state, are, scientifically considered, still in their infancy.

From the above, it will be understood that any of the available calcium phosphates can be used for mixing with a lime nitrogen fertilizer, and that the resulting product may contain any, or a mixture of two, or of all three, of the calcium phosphates, and that the calcium phosphates can be mixed either before the treatment with nitrogen gas, or before the treatment with carbon dioxide gas, or after the treatment with carbon dioxide gas. In the foregoing specification, by raw lime nitrogen is meant the product obtained after treating commercial calcium carbide with nitrogen, comprising calcium cyanamid, normal and overburned lime, and usually some calcium carbide, while by treated or carbonated lime nitrogen is meant such product as results when the free lime of raw lime nitrogen has been converted, as for instance, into one or more normal, or basic carbonates, or hydrated basic carbonates of calcium, or a mixture of all. By carbonate, is intended to be included basic, or hydrated carbonates, as well as normal carbonate, such as the calcium compounds mentioned herein. It is also to be understood that the foregoing reactions and materials are intended to be typical or explanatory, and not as limitations upon the invention except as specified in the appended claims, and within the range of permissible equivalents.

The fertilizer material resulting from this invention will contain, besides nitrogen and phosphates, more or less carbon dioxide gas in the form of carbonates. Carbon dioxide gas set free in the soil from any of these compounds will greatly increase the fertilizer value of the material. The carbon dioxide gas set free in the soil either by the acids in the soil, or by part of the phosphoric acid, will work on the silicious compounds of potash in the soil, and cause the potash to be dissolved. It will also have a dissolving action upon carbonates of lime and magnesia, and on the different oxides of iron and manganese, whereby these compounds, otherwise hardly available, will be conveyed to the plants.

Having thus described my invention, I declare that what I claim as new and desire to secure by Letters Patent is:

1. The process of producing an available phosphate which consists in treating an unavailable phosphate with condensed carbon dioxide and water.

2. The process which consists in treating tricalcium phosphate with condensed carbon dioxide and water.

3. The process which consists in treating tricalcium phosphate and lime nitrogen containing either lime or calcium hydroxide with carbon dioxide and water.

4. The process which consists in treating a phosphate with carbon dioxide in a condition of expansion, and water.

5. The process which consists in treating a calcium phosphate with carbon dioxide in a condition of expansion, and water.

6. The process which consists in treating a phosphate with lime nitrogen, carbon dioxide and water.

7. The process which consists in treating a phosphate with carbon dioxide in a condition of expansion, water and lime nitrogen.

8. The process which consists in treating a phosphate with carbon dioxide in a condition of expansion, water and raw lime nitrogen.

9. The process which consists in treating a calcium phosphate with carbon dioxide in a condition of expansion, water and raw lime nitrogen.

10. The process which consists in treating a calcium phosphate with carbon dioxide in a condition of expansion, water, lime and lime nitrogen.

11. The process which consists in treating tricalcium phosphate with carbon dioxide in a condition of expansion, water, and raw lime nitrogen.

12. The process which consists in treating tricalcium phosphate and calcium carbide mixture with nitrogen and heat, and then with water and with carbon dioxide.

13. The process which consists in treating tricalcium phosphate and calcium carbide mixture with nitrogen and heat, and then with water and with carbon dioxide in a condition of expansion.

14. The process which consists in treating dicalcium phosphate with carbonated lime nitrogen, water, and carbon dioxide.

15. The process which consists in treating tricalcium phosphate with carbonated lime nitrogen, water, and carbon dioxide.

16. The process which consists in moistening a pulverized mixture of lime nitrogen and overburned lime, and then treating with carbon dioxide.

In testimony whereof, I have signed my name to this specification this 11th day of April, 1917.

JOB MORTEN AUGUST STILLESEN.